(12) United States Patent
Kim

(10) Patent No.: US 9,133,302 B2
(45) Date of Patent: Sep. 15, 2015

(54) THERMOPLASTIC ELASTOMER COMPOSITIONS HAVING EXCELLENT THERMAL RESISTANCE

(71) Applicants: Hyundai Motor Company, Seoul (KR); Kia Motors Corporation, Seoul (KR)

(72) Inventor: Min-Soo Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 96 days.

(21) Appl. No.: 13/936,535

(22) Filed: Jul. 8, 2013

(65) Prior Publication Data

US 2014/0235765 A1 Aug. 21, 2014

(30) Foreign Application Priority Data

Feb. 19, 2013 (KR) .......................... 10-2013-0017302

(51) Int. Cl.
*C08G 63/672* (2006.01)
*C08K 5/353* (2006.01)
*C08K 5/3412* (2006.01)

(52) U.S. Cl.
CPC ............ *C08G 63/672* (2013.01); *C08K 5/3412* (2013.01); *C08K 5/353* (2013.01)

(58) Field of Classification Search
CPC ..... C08G 63/672; C08K 5/3412; C08K 5/353
USPC ............................................ 524/95; 528/301
See application file for complete search history.

(56) References Cited

U.S. PATENT DOCUMENTS

2007/0224377 A1* 9/2007 Leimbacher et al. ...... 428/36.92

FOREIGN PATENT DOCUMENTS

| KR | 10-558252 | 9/2000 |
|----|-----------|--------|
| KR | 10-2001-0020115 | 3/2001 |
| KR | 10-2004-0061766 A | 7/2004 |
| KR | 10-2008-0062580 A | 7/2008 |
| KR | 10-2008-0076940 | 8/2008 |
| KR | 10-2010-0079613 A | 7/2010 |

\* cited by examiner

*Primary Examiner* — Kriellion Sanders
(74) *Attorney, Agent, or Firm* — Mintz Levin Cohn Ferris Glovsky and Popeo, P.C.; Peter F. Corless

(57) ABSTRACT

Disclosed is a thermoplastic elastomer composition having excellent thermal resistance, and which includes a hard segment of a resin component, an elastic soft segment of a rubber component and the like. The thermoplastic elastomer composition has properties of both a plastic and a rubber, and, in particular, it has an elasticity as a function of a rubber at room temperature, and is further plasticized at high temperatures so as to be molded. Further, by increasing a proportion of the hard segment, the thermoplastic elastomer composition has improved heat resistance and grease resistance. Accordingly, the present invention provides a thermoplastic elastomer composition having excellent thermal resistance, which can be applied to an automotive constant velocity joint boot and the like.

8 Claims, 2 Drawing Sheets

Terephthalate Butanediol  
Hard Segment (Ester-based)

Terephthalate Methyleneglycol  
Soft Segment (Ether-based)

THERMOPLASTIC ELASTOMER COMPOSITIONS HAVING EXCELLENT THERMAL RESISTANCE

CROSS-REFERENCE TO RELATED APPLICATION

The present application claims priority to Korean Patent Application No. 10-2013-0017302, filed on Feb. 19, 2013, the entire contents of which is incorporated herein for all purposes by this reference.

BACKGROUND (a) Technical Field

The present invention relates to a thermoplastic elastomer composition having excellent thermal resistance, and more specifically to such a thermoplastic elastomer composition which improves heat resistance, grease resistance and the like of the composition and which can be applied to an automotive constant velocity joint boot and the like. In particular, the thermoplastic elastomer composition increases a hard segment proportion of the thermoplastic elastomer, which comprises a soft segment and a hard segment, and further comprises an amine-based additive.

(b) Background Art

A constant velocity joint boot plays a role of transferring rotational power from a vehicle engine and transmission to the wheels. The joint boot typically includes a joint part made of a bearing for smoothly transferring rotational power, grease at a joint part for reducing friction of the joint part, and a rubber material covering the connecting part. However, long-term durability is not maintained with the conventional rubber material due to a temperature increase around the boot which occurs when a discharge system for high power of vehicles changes.

Further, this reduced durability results in tearing of the rubber of the constant velocity joint boot, which allows the grease to flow out between the torn rubber. This flow of grease, causes a reduction of engine power, a reduction of vehicle lifespan, and an increase of noise under suspension.

In attempt to solve these problems, a heat resistance-improved composition based on a chloroprene rubber has been used. Conventional chloroprene rubber has been extensively used for a constant velocity joint boot due to its excellent grease resistance. However, in order to increase heat resistance of the chloroprene rubber composition, which has a use temperature of up to 100° C., a cross-linking accelerator was added, and a sulfur cross-link was changed to a peroxide cross-link. This increased the temperature range at which the chloroprene rubber composition can be used by about 20° C. Further, in order to secure low temperature flexibility of the chloroprene rubber composition, a plasticizer was further added thereto thereby expanding the temperature range at which the chloroprene rubber composition can be used to about −45~120° C.

However, although the temperature range at which the chloroprene rubber composition can be used became wider, there was a problem of continuous difficulty of use because the lifespan of the composition is short and variation in lifespan was wide based on external conditions.

Accordingly, it is needed to develop a composition, which can maintain the performance of the constant velocity joint boot even at high temperature, and has excellent performance such as grease resistance, salt water resistance and the like.

The description provided above as a related art of the present invention is just for helping understanding the background of the present invention and should not be construed as being included in the related art known by those skilled in the art.

SUMMARY OF THE DISCLOSURE

The present invention provides a thermoplastic elastomer composition having excellent thermal resistance. The present thermoplastic elastomer composition can be applied to a high-performance automotive constant velocity joint boot and the like, and provides improved heat resistance, grease resistance and the like. The present composition has an increased melt viscosity, which is preferably provided by increasing the proportion and molecular weight of a hard segment in a thermoplastic elastomer which comprises a soft segment, a hard segment and the like. Further, the present composition has an improved heat resistance and durability, which is preferably provided by adding amine-based additives having excellent heat resistance.

According to one aspect, the present invention provides a thermoplastic elastomer composition having excellent thermal resistance and comprising a thermoplastic elastomer consisting of a hard segment and a soft segment. According to preferred embodiments, the hard segment is derived from 1,4-butanediol (BDO), and dimethylene terephthalate (DMT) or polybutylene terephthalate (PBT), and the soft segment is derived from polytetramethylene etherglycon (PTMEG), and dimethylene terephthalate (DMT) or polybutylene terephthalate (PBT).

According to preferred embodiments, the amount of the hard segment is about 40~60 wt %, based on the weight of the thermoplastic elastomer.

According to various embodiments, the thermoplastic elastomer composition further comprises an amine-based additive. Preferably, the composition includes carbonyl-bis-caprolactam (CBC) and 1,3-phenylene-bis-oxazoline (1,3-PBO) as an amine-based additive.

The amount of the carbonyl-bis-caprolactam (CBC) and the 1,3-phenylene-bis-oxazoline (1,3-PBO) may vary. According to preferred embodiments, the amount of carbonyl-bis-caprolactam (CBC) is about 1~3 parts by weight, and the amount of the 1,3-phenylene-bis-oxazoline (1,3-PBO) is about 1~3 parts by weight, based on 100 parts by weight of the thermoplastic elastomer.

According to an exemplary embodiment, the amount of the carbonyl-bis-caprolactam (CBC) is about 3 parts by weight and the amount of the 1,3-phenylene-bis-oxazoline (1,3-PBO) is about 2 parts by weight, based on 100 parts by weight of the thermoplastic elastomer.

According to a further aspect, the thermoplastic elastomer composition having excellent thermal resistance is applied to an automotive constant velocity joint boot and the like.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
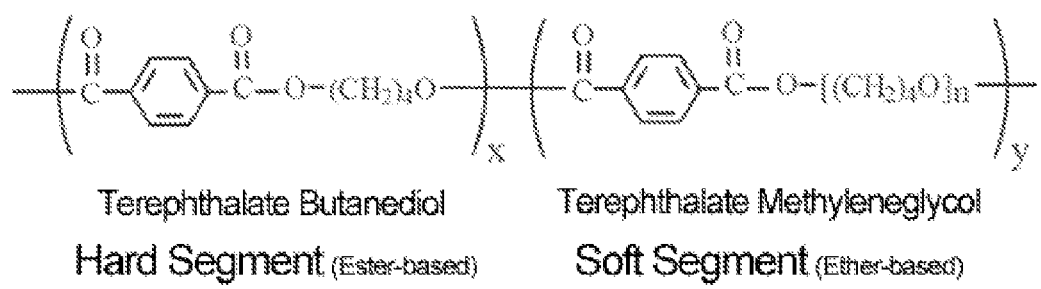
FIG. 1 is a chemical formula of one example wherein a hard segment and a soft segment are connected each other according to one embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terms and the words used in the specification and claims should not be construed with common or dictionary meanings, but construed as meanings and conception coinciding the spirit of the invention based on a principle that the inventors can appropriately define the concept of the terms to explain the invention in the optimum method.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present invention will be described in detail with reference to the accompanying Tables and drawings.

1. Components

The present invention relates to a thermoplastic elastomer composition having excellent thermal resistance. The thermoplastic elastomer is a polymer material having both characters of plastic and rubber by its inclusion of a hard segment of a resin component, an elastic soft segment of a rubber component and the like. According to embodiments of the present invention, the thermoplastic elastomer composition has an elasticity identical (or nearly identical) with that, of the rubber at room temperature, while also being plasticized at high temperature, so as to be molded.

More specifically, the thermoplastic elastomer (TPE) is formed by hydrogen bonding, ion bonding, van der Waals bonding and physical cross-linking. This is in contrast with a vulcanized rubber, which is cross-linked by strong covalent bonding. Accordingly, the TPE of the present invention it has an elasticity similar to that of a vulcanized rubber at room temperature, but it can be subjected to extrusion and injection molding unlike the vulcanized rubber. In particular, while the vulcanized rubber is carbonized when heating, the TPE of the present invention maintains an extrusion and injection molded shape and shows elasticity when cooled.

According to embodiments of the present invention, the above-described characteristics are provided through the use of the hard segment and the soft segment inside the thermoplastic elastomer. The hard segment contributes to physical bonding, and, in particular, hydrogen bonding, ion bonding, van der Waals bonding, physical cross-link and the like are typically used. The soft segment contributes to providing elasticity like the rubber, such that when molecules in a disordered state become ordered by an external force, elasticity is generated by natural return to the disordered state.

FIG. 1 shows a chemical formula of the hard segment connected with the soft segment according to an embodiment of the present invention. As shown in FIG. 1, the thermoplastic elastomer composition consists of hard segment containing terephthalate and butanol, and the soft segment containing terephthalate and methylene glycol.

In the thermoplastic elastomer comprising the hard segment and the soft segment, it is preferred that the hard segment is derived from 1,4-butanediol (BDO); and dimethylene terephthalate (DMT) or polybutyleneterephthalate (PBT). It is further preferred that the soft segment is derived from polytetramethylene etherglycon (PTMEG); and dimethyleneterephthalate (DMT) or polybutyleneterephthalate (PBT).

2. Contents

In order to improve heat resistance and grease resistance of the composition, in the present invention, it is preferred that the amount of the hard segment, is about 40~60 wt %, based on the total weight of the thermoplastic elastomer. According to a preferred embodiment, the hard segment is formed of dimethyl terephthalate (DMT) and 1,4-butanediol (BDO).

3. Bulk Polymerization

The polymerization method for manufacturing a polymer may be solution polymerization, bulk polymerization, suspension polymerization, emulsion polymerization and the like. In the past, solution polymerization was used for polymerizing thermoplastic elastomers. The present invention is characterized by using bulk polymerization. This is because, when using the bulk polymerization, molecular weight of the thermoplastic elastomer can be further increased. This increase in molecular weight allows for an increase in melt viscosity of the elastomer, which thereby improves heat resistance, grease resistance and the like of the thermoplastic elastomer.

With respect to solution polymerization, this method is a polymerization method using a monomer, a solvent and an initiator, wherein heat generated during polymerization is easily removed by evaporative reflux of the solvent. However, solution polymerization is not a good method for obtaining a solid polymer because it is not easy to remove the solvent after completing the polymerization. Further, molecular weight of the polymer is lower than polymers provided through other polymerization methods, and polymerization is slow due to the use of the solvent.

With respect to bulk polymerization, this method is a polymerization method using a monomer and an initiator, and has an advantage of obtaining a pure polymer without impurities. In bulk polymerization, it is easy to perform processes such as stirring, removing heat of polymerization and the like because viscosity of the polymer is not high except in the last stage of the polymerization reaction. Further, bulk polymerization is advantageous in that reaction apparatuses are simple and easy to operate, and a highly pure product having high polymerization degree can be obtained.

More specifically, molecular weight of the conventional thermoplastic elastomer, which was prepared using the solution polymerization method, was 100,000 or less. On the other hand, the thermoplastic elastomer according to the present invention, which was prepared using the bulk polymerization method is characterized in that the molecular weight thereof is about 200,000 or more, which is at least twice that of the conventional thermoplastic elastomer. Further, due to the increased molecular weight of the present composition, the melt viscosity is increased by at least about twice that of conventional thermoplastic elastomers, particularly from about 1.7 g/min to about 0.5 g/min.

4. Amine-Based Additives

Figure 2:
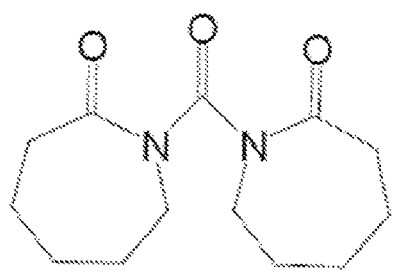
FIG. 2 is a chemical formula of carbonyl-bis-caprolactam (CBC)
Figure 3:
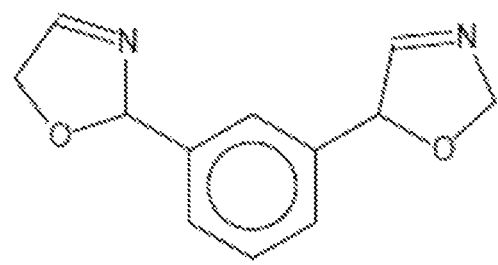
FIG. 3 is a chemical formula of 1,3-phenylene-bis-oxazoline (1,3-PBO).

The thermoplastic elastomer composition according to the present invention preferably further comprises an amine-based additive as a heat stabilizer and an anti-aging agent in order to increase the heat resistance and improve the durability. According to various embodiments, the heat resistance is increased by about 16% or more as compared with conventional thermoplastic elastomer compositions. The amine-based additives can be any known in the art, and it preferably is a combination of carbonyl-bis-caprolactam (CBC) and 1,3-phenylene-bis-oxazoline (1,3-PBO). Herein, FIG. 2 is a chemical formula of the carbonyl-bis-caprolactam (CBC), and FIG. 3 is a chemical formula of the 1,3-phenylene-bis-oxazoline (1,3-PBO).

Further, it is preferred that the amine-based additive comprises a combination of carbonyl-bis-caprolactam and 1,3-phenylene-bis-oxazoline, wherein the combination includes about 1~3 parts by weight carbonyl-bis-caprolactam and about 1~3 parts by weight 1,3-phenylene-bis-oxazoline, based on 100 parts by weight of the thermoplastic elastomer. According to an exemplary embodiment, the amine-based additive comprises about 3 wt % carbonyl-bis-caprolactam and about 2 wt % 1,3-phenylene-bis-oxazoline.

According to some embodiments of the present invention, the composition further comprises various additives, reinforcing agents, heat resistance stabilizers as a filler, weather resistance stabilizers, antistatic agents, lubricants, slip agents, nucleating agents, frame resistants, wollastonite, calcium carbonate, mica, kaolin, clay, barium sulfate, calcium sulfate and/or the like.

5. Use

The thermoplastic elastomer composition having excellent thermal resistance according to the present invention is particularly suitable for use in an automotive constant velocity joint boot and the like.

6. Manufacturing Method

Hereinafter, in another aspect, the present invention relates to a method for manufacturing a low viscosity engine oil composition.

The thermoplastic elastomer composition having excellent thermal resistance according to the present invention can be properly manufactured by a person skilled in the art by referring to known technologies.

Hereinafter, the present invention will be described in further detail with reference to examples. It will be obvious to a person having ordinary skill in the art that these examples are illustrative purposes only and are not to be construed to limit the scope of the present invention.

[Example]

Components and contents of Example 1 according to the present invention and Comparative Examples 1 and 2 on the market were compared and tested in their physical properties, and the results were listed in the following Table 1 and Table 2.

TABLE 1

| | Item | Example 1 | Comparative Example 1 | Comparative Example 2 |
|---|---|---|---|---|
| Polymer | CR | — | 100 | 100 |
| | TPEE | 100 | — | — |
| Filler | HAF (N330) | — | — | 60 |
| | FEF (N550) | — | 60 | — |
| Plasticizer | RS-700 | — | 10 | 5 |
| Additives | 3C | — | 3 | 3 |
| | MB | — | 1 | 1 |
| | Sunnoc | — | 3 | 2 |
| | CBC | 3 | — | — |
| | 1,3-PBO | 2 | — | — |
| Vulcanizing | S | — | 2 | 2 |
| Agent | TMTD | — | 5 | 3 |
| | ZnO | — | 4 | 2 |
| | Stearic Acid | — | 1 | 0.5 |

Note
CR (chloroprene rubber): Neoprene W, DDE (Dupont Dow Elastomer)
TPEE (Hytrel 8685BK): Hytrel 8685BK (Dupont)
HAF (N330), FEF (N550): Korea Carbon Black
3C: N-phenyl-N'-isopropyl-p-phenylene diamine (Kumho Monsanto)
MB: 2-mercaptobenzimidazole, (Nurchem)
Sunnoc-DW (Daewoon Industry)
CBC: Carbonyl-bis-caprolactam (DSM)
1,3-PBO: Phenylene-bis-oxazoline (Chemsphere Taiwan)
ZnO (Hanil zinc oxide)
Stearic Acid (Dansuk Industry)

The Table 1 is a table comparing the components and contents of Example 1 according to the present invention and Comparative Examples 1 and 2 which are conventional compositions on the market.

Example 1 of the above Table comprised a thermoplastic polyester elastomer (TPEE) containing a hard segment and a soft segment, carbonyl-bis-caprolactam (CBC) and 1,3-phenylene-bis-oxazoline (1,3-PBO).

Herein, as the thermoplastic polyester elastomer, Hytrel 8685BK, a product from Dupont, was used, and as the carbonyl-bis-caprolactam and 1,3-phenylene-bis-oxazoline, products of DSM and Chemsphere Taiwan were used, respectively.

Further, based on 100 parts by weight of the thermoplastic polyester elastomer, the carbonyl-bis-caprolactam (CBC) was used in an amount of 3 parts by weight and the 1,3-phenylene-bis-oxazoline (1,3-PBO) was used in an amount of 2 parts by weight.

Comparative Examples 1 and Comparative Example 2 of the above Table are thermoplastic elastomer compositions containing chloroprene rubber produced from Dupont as a major component, and a filler, a plasticizer, vulcanizing agents and other additives.

TABLE 2

| Item | | Example 1 | Comparative Example 1 | Comparative Example 2 |
|---|---|---|---|---|
| Material | Hardness (Hs) | 43 (shore D) | 60 (shore A) | 60 (shore A) |
| Heat Resistance (140° C., 336 hrs) | Hardness Change (ΔHs) | −2 | +26 | +35 |
| | Tensile Strength Change Rate (%) | −13 | −29 | −79 |
| | Elongation Rate Change Rate (%) | −9 | −79 | −90 |
| Grease Resistance (140° C., 336 hrs) | Hardness Change (ΔHs) | −1 | −16 | Not Measurable |
| | Tensile Strength Change Rate (%) | −16 | 3 | |
| | Elongation Rate Change Rate (%) | −6 | −42 | |
| | Volume Change Rate (%) | +7 | +20 | |
| Hydrolysis Resistance (80° C., 336 hrs, 95 RH %) | Hardness Change (ΔHs) | −1 | −5 | −10 |
| | Tensile Strength Change Rate (%) | +2 | −10 | −23 |
| | Elongation Rate Change Rate (%) | +1 | −15 | −40 |
| | Volume Change Rate (%) | +1 | +3 | +15 |
| Salt Water Resistance (100° C., 336 hrs, 25 wt % CaCl$_2$) | Hardness Change (ΔHs) | +1 | +3 | +20 |
| | Tensile Strength Change Rate (%) | −5 | −10 | −39 |
| | Elongation Rate Change Rate (%) | +17 | −30 | −48 |
| Compression Permanent Decrease Rate (140° C., 22 hrs) | | 69 | 50 | 78 |
| Cold Shortness (−45° C. or less) | | −67 | −47 | −50 |
| Parts | Thermal Resistance Tremble Durability Test (140° C.) | Satisfaction (168 hrs) | Dissatisfaction (3 hrs) | Dissatisfaction (1 hr) |
| | Room Temperature Rotational Durability Test | 735 hrs | 335 hrs | 215 hrs |

The Table 2 is a table comparing the results of testing physical properties of Example 1, Comparative Examples 1 and 2 based on the contents of the above Table 1. Excellent thermoplastic elastomer composition should have low variation on hardness change, tensile strength change rate, elongation ratio change rate, volume change rate and the like.

Example 1 had Shore D hardness of 43, and Comparative Examples 1 and 2 had Shore A hardness of more than 60. Accordingly, it was demonstrated that Example 1 had higher hardness than the conventional compositions.

The heat resistance test is a test that investigates how well the composition can endure heat, and hardness change, tensile strength change rate and elongation change rate were measured at 140° C. for 336 hrs. Based on the three measurement values, Example 1 had the greatest power resisting against heat because the variation of Example 1 was smaller than Comparative Examples 1 and 2. Accordingly, it was demonstrated that Example 1 had the best heat resistance.

The grease resistance test is a test that investigates how well the composition can endure grease, and hardness change, tensile strength change rate, elongation change rate and volume change rate were measured at 140° C. for 336 hrs. Based on the four measurement values, Example 1 had the biggest power resisting against grease because the variation of Example 1 was smaller than Comparative Examples 1 and 2. Accordingly, it was demonstrated that Example 1 had the best grease resistance.

The hydrolysis resistance test is a test that investigates how well the composition can endure moisture, and hardness change, tensile strength change rate, elongation change rate and volume change rate were measured at 80° C. for 336 hrs under a condition of relative humidity of 95%. Based on the four measurement values, Example 1 had the biggest power resisting against moisture because the variation of Example 1 was smaller than Comparative Examples 1 and 2. Accordingly, it was demonstrated that Example 1 had the best hydrolysis resistance.

The salt water resistance test is a test that investigates how well the composition can endure salt, and hardness change, tensile strength change rate and elongation change rate were measured at 100° C. for 336 hrs under a condition of 25 wt % calcium chloride content. Based on the three values, Example 1 had the biggest power resisting against salt because the variation of Example 1 was smaller than Comparative Examples 1 and 2. Accordingly, it was demonstrated that Example 1 had the best salt water resistance.

The compression permanent decrease rate test is a test that measures a ratio to return after compressing at 140° C. for 22 hrs. As demonstrated, the value of Example 1 was better than that of Comparative Example 1, but worse than that of Comparative Example 2. Accordingly, it was demonstrated that the compression permanent decrease rate of Example 1 was average.

The cold shortness test is a test that investigates the lowest temperature at which the composition is fractured. As demonstrated, the value of Example 1 was the best (i.e. Example 1 had the lowest fracture temperature).

The thermal resistance tremble durability test is a test that investigates the durability of parts made by the compositions under a condition of 140° C. As demonstrated, the durability of Example 1 was maintained for 168 hrs, while the durability of Comparative Examples 1 and 2 was maintained for only 3 hrs and 1 hr, respectively. Accordingly, it was demonstrated that the durability of Example 1 was much higher.

The room temperature rotational durability test is a test that investigates the durability of parts made by the compositions under a high speed rotation condition. As demonstrated, the durability of Example 1 was maintained for 735 hrs, while the durability of Comparative Examples 1 and 2 was maintained for only 335 hrs and 215 hrs, respectively. Accordingly, it was demonstrated that the durability of Example 1 was much higher.

Thus, when considering all of the physical tests, it was confirmed that the performance of a composition of Example 1 (a composition according to the present invention) was much better than the performance of compositions of Comparative Examples 1 and 2.

The present invention, having the constitution described above, has advantages of improving heat resistance and grease resistance of the thermoplastic elastomer by increasing the proportion of the hard segment of the thermoplastic elastomer, which contains a soft segment, a hard segment and the like, and increasing molecular weight.

By replacing the conventional parts, such as an automotive constant velocity joint boot, which is typically constituted mainly of a chloroprene elastomer, with the composition of the present invention, the thermoplastic elastomer composition can be beneficially used in a high-power engine.

The invention has been described in detail with reference to preferred embodiments thereof. However, it will be appreciated by those skilled in the art that changes or modifications may be made in these embodiments without departing from the principles and spirit of the invention, the scope of which is defined in the appended claims and their equivalents.

What is claimed is:

1. A thermoplastic elastomer composition having excellent thermal resistance, the thermoplastic elastomer composition comprising
a thermoplastic elastomer consisting of a hard segment and a soft segment; and
an amine-based additive,
wherein the hard segment is derived from (a) 1,4-butanediol (BDO), and (b) dimethylene terephthalate (DMT) or polybutylene terephthalate (PBT), and the soft segment is derived from (a) polytetramethylene etherglycon (PTMEG), and (b) dimethylene terephthalate (DMT) or polybutylene terephthalate (PBT),
wherein the amine-based additive is a combination of carbonyl-bis-caprolactam (CBC) and 1,3-phenylene-bis-oxazoline (1,3-PBO), and the amount of the carbonyl-bis-caprolactam (CBC) is about 1~3 parts by weight and the amount of the 1,3-phenylene-bis-oxazoline (1,3-PBO) is about 1~3 parts by weight, based on 100 parts by weight of the thermoplastic elastomer.

2. The thermoplastic elastomer composition according to claim 1, wherein the amount of the hard segment is about 40~60 wt %, based on the total weight of the thermoplastic elastomer.

3. The thermoplastic elastomer composition according to claim 1, wherein the amount of the carbonyl-bis-caprolactam (CBC) is about 3 parts by weight and the amount of the 1,3-phenylene-bis-oxazoline (1,3-PBO) is about 2 parts by weight, based on 100 parts by weight of the thermoplastic elastomer.

4. An automotive constant velocity joint boot comprising the thermoplastic elastomer composition according to claim 1.

5. A thermoplastic elastomer composition having excellent thermal resistance, the thermoplastic elastomer composition comprising; and
a thermoplastic elastomer consisting of a hard segment and a soft segment; and;
an amine-based additive,
wherein the hard segment is derived from (a) butanediol (BDO) and (b) terephthalate, and the soft segment is derived from (a) polytetramethylene etherglycon (PT-MEG) and (b) terephthalate,
wherein the amine-based additive is a combination of carbonyl-bis-caprolactam (CBC) and 1,3-phenylene-bis-oxazoline (1,3-PBO), and the amount of the carbonyl-bis-caprolactam (CBC) is about 1~3 parts by weight and the amount of the 1,3-phenylene-bis-oxazoline (1,3-PBO) is about 1~3 parts by weight, based on 100 parts by weight of the thermoplastic elastomer.

6. The thermoplastic elastomer composition according to claim 5, wherein the amount of the hard segment is about 40~60 wt %, based on the total weight of the thermoplastic elastomer.

7. The thermoplastic elastomer composition according to claim 5, wherein the amount of the carbonyl-bis-caprolactam (CBC) is about 3 parts by weight and the amount of the 1,3-phenylene-bis-oxazoline (1,3-PBO) is about 2 parts by weight, based on 100 parts by weight of the thermoplastic elastomer.

8. An automotive constant velocity joint boot comprising the thermoplastic elastomer composition according to claim 5.

* * * * *